United States Patent [19]

Forbes

[11] 4,121,796
[45] Oct. 24, 1978

[54] SUPPORTING ELEMENTS FOR DUCTING

[76] Inventor: George Alfred Forbes, 75 Ellerby St., London S.W. 6, England

[21] Appl. No.: 829,201

[22] Filed: Aug. 30, 1977

[30] Foreign Application Priority Data

Sep. 4, 1976 [GB] United Kingdom .............. 36744/76
May 21, 1977 [GB] United Kingdom .............. 21546/77

[51] Int. Cl.² ............................................. F16L 3/00
[52] U.S. Cl. .................................... 248/62; 138/107; 248/54 R
[58] Field of Search ...................... 248/58, 59, 62, 60, 248/54 R, 74 R, 218.4, 230, 231, 49; 138/106, 107, 112, 113, DIG. 4; 285/64; 137/357; 24/282

[56] References Cited

U.S. PATENT DOCUMENTS

| 360,782 | 4/1887 | Ober ..................................... 138/113 |
| 957,571 | 5/1910 | McCune ................................... 285/64 |
| 1,864,651 | 6/1932 | Hawley .............................. 248/74 R |
| 2,099,756 | 11/1937 | Seigle ............................. 138/DIG. 4 |
| 2,325,616 | 8/1943 | Landweber ....................... 138/113 X |
| 2,509,503 | 5/1950 | Huyton .................................. 248/49 |
| 3,244,388 | 4/1966 | Coffman ........................... 138/107 X |
| 3,462,104 | 8/1969 | Muller et al. .......................... 248/62 |
| 3,606,218 | 9/1971 | Enlund et al. ................. 248/54 R X |
| 3,944,175 | 3/1976 | Kearney ................................. 248/62 |
| 4,056,679 | 11/1977 | Brandt et al. .................... 138/113 X |

Primary Examiner—Rodney H. Bonck
Attorney, Agent, or Firm—Scully, Scott, Murphy & Presser

[57] ABSTRACT

A supporting element for use in supporting ducting, particularly air ducting used in air-conditioning installations, comprises a metal strip shaped with transverse bends. The metal strip has a first minor extent of its length formed as curved bearing surfaces spaced around an arc at least approximately conforming to a semi-circle and a second minor extent of its length formed as fastening flanges extending radially outwards of said semi-circle substantially at the diametrically opposed ends of the arc. In use a pair of such elements are arranged in opposed relationship on opposite sides of a ducting having rounded lateral sides with tie-rods connecting the opposed fastening flanges. It is preferred that isolating pads of heat and/or sound insulating material are provided on each said bearing surface.

5 Claims, 3 Drawing Figures

SUPPORTING ELEMENTS FOR DUCTING

FIELD OF THE INVENTION

This invention relates to the support of ducting, more especially air ducting used in air-conditioning installations, and in particular the invention relates to a supporting element for use in supporting such ducting and to a method of use thereof.

BACKGROUND TO THE INVENTION

Ducting of rectangular and of circular sections has been used for many years in air-conditioning systems. Circular ducting has sometimes been made by a wrapping technique, in which a long length of sheet metal strip is wrapped around a subsequently withdrawn mandrel with successive turns in sealed overlapping relationship. More recently, an adaptation of this wrapping technique has made possible the production of modified rectangular ducting having rounded corners, so that two opposite sides of the ducting assume opposed approximate semi-circular configurations separated by the major dimension of the modified rectangular section. Ducting of this shape has some considerable advantages in practice, and is likely to be increasingly employed.

However, traditional and known methods of supporting air ducting are unsuitable or disadvantageous for modified rectangular ducting, and it is an object of the present invention to provide a supporting element for this ducting and a method of supporting such ducting using the supporting elements.

SUMMARY OF THE INVENTION

According to the invention, there is provided a supporting element for use in supporting air ducting and comprising a metal strip shaped with transverse bends such that a first minor extent of its length forms curved bearing surfaces spaced around an arc at least approximately conforming to a semi-circle and a second minor extent of its length forms fastening flanges extending radially outwards of said semi-circle substantially at the diametrically opposed ends of the arc.

In some constructions according to the invention, the supporting element may comprise a metal strip having a major central portion of its length formed into an at least approximate semi-circular shape and its two end portions turned back on the inside of the semi-circular central portion in spaced parallel relationship thereto, whereby to provide the supporting element with two spaced hollow limbs, two intermediate portions of the strip between the central portion and the respective end portions each being substantially flat and connected to said central portion and the respective end portion through right-angled bends, whereby to form flat ends on said hollow limbs constituting said fastening flanges.

In use, the turned back end portions of the supporting elements will be located tightly and resiliently against the semi-circular opposite sides of the ducting, firmly to support the ducting without risk of vibration.

In such constructions, the inside surface of each turned back end portion of the supporting element is preferably provided with an isolating pad, preferably of sound and/or thermal insulating material. In this way transmission of sound and heat to the building structure, through the supporting elements, tie rods and suspension brackets, is substantially avoided.

In other constructions according to the invention, the metal strip may be shaped with transverse bends so that its extreme end portions form the two fastening flanges and the two respective portions immediately adjacent said end portions form the curved bearing surfaces. The major extent of the metal strip between said bearing surfaces is preferably at least partly disposed on a semi-circle of larger radius than that defined by the bearing surfaces. Said major lengthwise extent of the metal strip may either lie wholly on said semi-circle of larger radius or alternatively an additional bearing surface may be formed at the central region of the semi-circular arc defined by the two first-mentioned bearing surfaces. Preferably, each bearing surface will be provided with an isolating pad, preferably of sound and/or thermal insulating material. In this way transmission of sound and heat to the building structure, through the supporting elements, tie rods and suspension brackets, is substantially avoided.

The invention also provides a method of supporting modified rectangular ducting, wherein two supporting elements according to said some constructions of the invention are arranged in opposed relationship on opposite sides of the ducting, and clamped together with the ducting between them by means of a pair of tie rods extending parallel to the major dimension of the section of the ducting in spaced relation to the walls thereof, the respective tie-rods being tightened up between the respective opposed flat ends of the hollow limbs of the supporting elements. The upper tie rod will be rigidly suspended from a bracket on a building structure.

The invention further provides a method of supporting modified rectangular ducting, wherein two supporting elements according to the invention are arranged in opposed relationship on opposite sides of the ducting, and clamped together with the ducting between them by means of a pair of tie rods extending parallel to the major dimension of the ducting in spaced relation to the walls thereof, the respective tie rods being tightened between the respective opposed fastening flanges to draw the bearing surfaces into clamping engagement with the rounded sides of the ducting.

In practice, pairs of supporting elements clamped together by means of tie rods will be provided at spaced positions along the ducting, and the ducting will be lagged. The above-described construction of supporting elements minimizes the interruption to the lagging, which can be passed between the ducting and the tie rods and inside the hollow limbs of the supporting elements.

BRIEF DESCRIPTION OF THE DRAWINGS

Practical embodiments of the supporting element and their method of use are illustrated by way of example in the accompanying drawings, in which.

DETAILED DESCRIPTION

Figure 1:
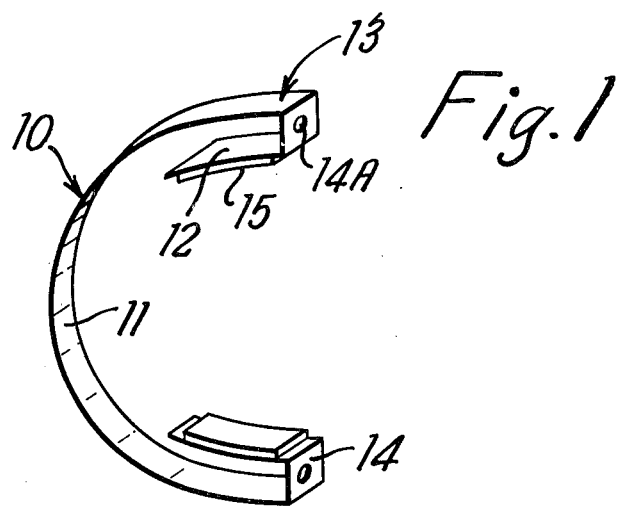
FIG. 1 shows the supporting element in perspective view.

The supporting element 10 shown in FIG. 1 comprises a metal strip having a major central portion 11 of its length formed into a semi-circular shape and its end portion 12 turned back on the inside of the semi-circular central portion, whereby to form two hollow limbs 13. The turned back portions 12 could be sufficiently long to meet at the centre of the semi-circular central portion 11, but are preferably much shorter than this, as shown. However, they are long enough to ensure tight engagement with the ducting to be supported, as will be clear from FIG. 2. The return end portions 12 are spaced inside the semi-circular portion 11 in parallel relationship thereto by the width of two intermediate portions 14 of the strip, which form flat end faces on the ends of the hollow limbs 13. As shown these flat end faces are coplanar, but it is not essential for the limbs 13 to be of equal lengths, as long as they are formed flat by means of right-angled bends between the semi-circular central portion 11 and the respective end portions 12.

Figure 2:
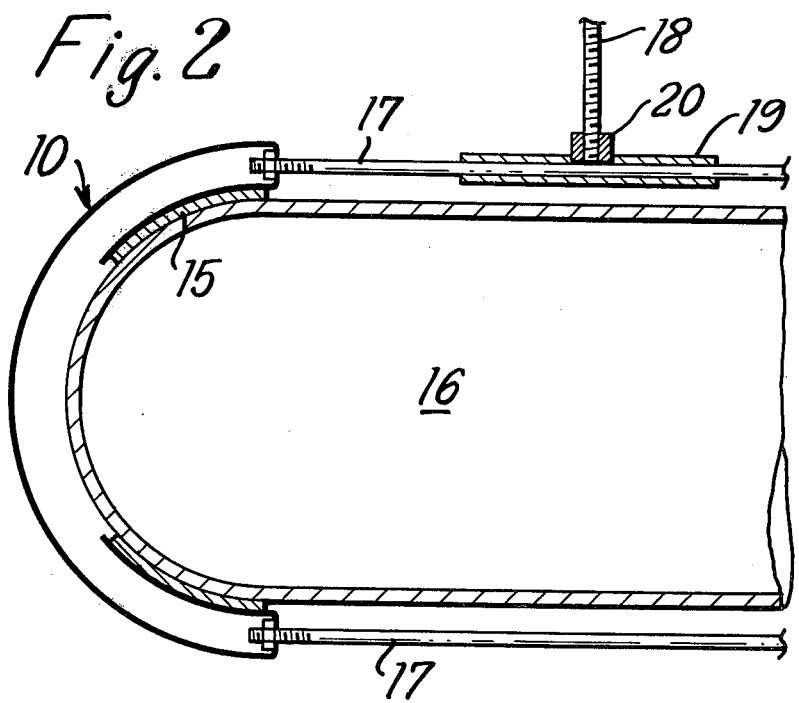
FIG. 2 shows the method of use of the supporting element for supporting air-conditioning ducting.

The inside face of each hollow limb 13 is provided with an isolating pad 15 of thermal/sound insulating material, for example high density cork, the purpose of which will be clear from the following description of FIG. 2. The flat end face 14 of each limb is formed with a hole 14A for receiving an end of a tie rod, as is also clear from FIG. 2.

FIG. 2 shows the left-hand side of a section through an air duct 16 of the modified rectangular form previously referred to. At each of a number of spaced positions along its length, the duct 16 is supported by a pair of supporting elements 10, the left-hand element of one pair being shown in FIG. 2. The two supporting elements 10 of a pair are tied together to clamp the duct 16 between them by means of tie rods 17 tightened up between the opposed flat end faces 14 of the upper limbs of the two supporting elements of the pair, and correspondingly between the lower limbs. The upper tie rod 17 can be suspended from the building structure on a drop rod 18, to which it is attached by means of a sleeve 19 around the tie rod and an upstanding internally threaded boss 20 fixed to the sleeve. The upper tie rod 17 may be suspended from the drop rod 18 by means of various other suspension arrangements, i.e., two drop rods at each extremity of rod 17.

When the tie rods are tightened up, the ducting is clamped between the supporting clamps through the intermediary of the isolating pads 15, which act to prevent sound and vibration being transmitted to the building structure. The hollow limbs 13 of the supporting elements 10 will be slightly deformed when the tie rods are tightened up, which ensures that the tight clamping of the duct 16 will be maintained throughout temperature and other environmental changes, and over a prolonged period.

It will be appreciated that the supporting element of this invention may also be used for supporting substantially circular ducting, using tie bolts which effectively clamp a pair of supporting elements into a closed circular arrangement around the duct.

Figure 3:
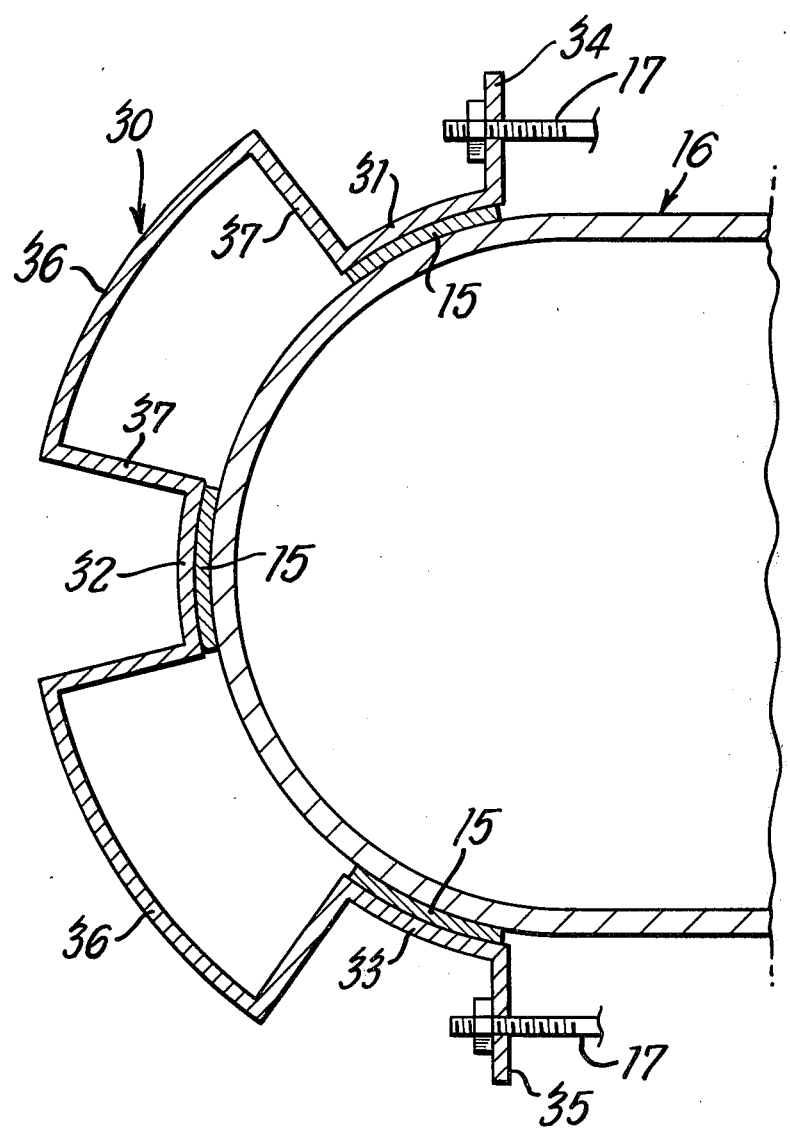
FIG. 3 shows a second embodiment of a supporting element in use, in transverse section through the ducting.

Referring to FIG. 3, the supporting element 30 comprises a metal strip shaped with transverse bends as shown such that three spaced short intermediate portions 31, 32, 33 are spaced around a semi-circular arc, two at the ends thereof and one at the centre. These three portions 31, 32, 33 constitute surfaces which, through the intermediary of thermal and/or sound insulating pads 15, in use bear against the rounded sides of modified rectangular air ducting 16. The extreme end portions, 34, 35 of the metal strip are bent radially outwards of the diametrically opposed ends of the semi-circular arc and in use constitute fastening flanges by means of which the ducting 16 is clamped between a pair of opposed supporting elements 30 by means of tie-rods 17. The remaining, relatively long, portions of the length of the metal strip designated 36 are conveniently disposed on a semi-circle of larger radius, these portions 36 being connected to the bearing surfaces 31, 32, 33 by means of approximately radial short connecting portions 37. If desired, the bearing surface 32 can be omitted.

The manner of use of the supporting elements 30 to support air ducting is substantially the same as hitherto described especially with reference to FIG. 2.

The above described supporting elements 10 and 30 may be provided as bent metal strips or they may be formed as aluminium extrusions in the shapes shown in the drawing.

What is claimed is:

1. A supporting element for use in supporting air ducting and comprising a metal strip having a major central portion of its length formed into an at least approximate semi-circular shape and its two end portions turned back on the inside of the semi-circular central portion in spaced parallel relationship thereto, whereby to provide the supporting element with two spaced hollow limbs, two intermediate portions of the strip between the central portion and the respective end portions each being substantially flat and connected to said central portion and the respective end portion through right-angled bends, whereby to form flat ends on said hollow limbs constituting fastening flanges.

2. A support element as claimed in claim 1, wherein the inside surface of each turned back end portion of the supporting element is provided with an isolating pad.

3. A support element as claimed in claim 2, wherein each pad is made of sound and/or thermal insulating material.

4. A system for supporting modified rectangular ducting, comprising two supporting elements as claimed in claim 1 are arranged in opposed relationship on opposite sides of the ducting, and clamped together with the ducting between them by means of a pair of tie rods extending parallel to the major dimension of the section of the ducting in spaced relation to the walls thereof, the respective tie rods being tightened up between the respective opposed flat ends of the hollow limbs of the supporting elements.

5. A system as claimed in claim 4, wherein the upper tie rod is rigidly suspended from a bracket on a building structure.

* * * * *